(12) United States Patent
Kim et al.

(10) Patent No.: US 12,240,360 B2
(45) Date of Patent: Mar. 4, 2025

(54) VERTICALLY HEIGHT ADJUSTABLE SEATBACK FOR A VEHICLE

(71) Applicant: GM Global Technology Operations LLC, Detroit, MI (US)

(72) Inventors: Jongphill Kim, Incheon (KR); Namjin Hur, Seoul (KR); Jaeyoun Cho, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 18/166,822

(22) Filed: Feb. 9, 2023

(65) Prior Publication Data

US 2024/0270130 A1  Aug. 15, 2024

(51) Int. Cl.
*B60N 2/22* (2006.01)

(52) U.S. Cl.
CPC .... *B60N 2/2213* (2013.01); *B60N 2002/2204* (2013.01)

(58) Field of Classification Search
CPC .......................... B60N 2002/2204; A47C 7/402
See application file for complete search history.

(56) References Cited

U.S. PATENT DOCUMENTS

| | | | | |
|---|---|---|---|---|
| 6,447,062 B1* | 9/2002 | Jaekel | ................. | B60N 2/829 |
| | | | | 297/284.7 |
| 8,348,339 B2* | 1/2013 | Onuma | ............. | B60N 2/02246 |
| | | | | 297/284.3 |
| 8,894,142 B2* | 11/2014 | Alexander | ............. | B60N 2/876 |
| | | | | 297/216.12 |
| 10,455,946 B1* | 10/2019 | Wang | ..................... | A47C 7/462 |
| 2003/0214166 A1* | 11/2003 | Schambre | ............. | B60N 2/643 |
| | | | | 297/284.1 |
| 2008/0252128 A1* | 10/2008 | Nishikawa | ............. | B60N 2/233 |
| | | | | 297/354.11 |

FOREIGN PATENT DOCUMENTS

| | | | | |
|---|---|---|---|---|
| DE | 102008032719 A1 | * | 1/2010 | ......... B60N 2/2222 |
| DE | 102018120644 A1 | * | 2/2019 | ............ B60N 2/002 |
| EP | 1241047 A2 | * | 9/2002 | ......... B60N 2/2222 |
| EP | 2135770 A1 | * | 12/2009 | ............ B60N 2/163 |
| KR | 970036527 A | * | 7/1997 | |
| KR | 19980013365 U | * | 6/1998 | |
| KR | 102350128 B1 | * | 1/2022 | |

* cited by examiner

Primary Examiner — Timothy J Brindley
(74) Attorney, Agent, or Firm — CANTOR COLBURN LLP (57) ABSTRACT

A vehicle seat includes a seat base and a selectively vertically adjustable seatback coupled to the seat base. The selectively vertically adjustable seatback including a first frame component coupled to the seat base and a second frame component connected to the first frame component, the second frame component being shiftable relative to the seat base.

20 Claims, 7 Drawing Sheets

VERTICALLY HEIGHT ADJUSTABLE SEATBACK FOR A VEHICLE

INTRODUCTION

The subject disclosure relates to vehicles and, more particularly, to a vertically height adjustable seat for a vehicle.

Vehicles include a number of seats that accommodate a driver and/or passengers. Many seats, particularly, the driver's seat, include multiple adjustments to promote comfort. Seats may be shifted forwardly or rearwardly, raised or lowered, and seatbacks may be tilted forwardly or rearwardly. In addition, cushions may be inflated and/or deflated to establish a desired level of comfort or support for a vehicle occupant. While adjustments are available to accommodate long and/or short legs, poor posture, and the like, currently, seatback height is not an available adjustment.

A person with a longer than average torso may find themselves lacking shoulder and/or lumber support or may be out of position relative to a headrest mounted on the seatback. An individual with a shorter than average torso may likewise lack shoulder and/or lumber support and may be out of position relative to the headrest. Accordingly, it is desirable to provide a vehicle seat with a height adjustable seatback that can enhance comfort for individuals with longer and/or shorter torsos.

SUMMARY

In accordance with a non-limiting example, a vehicle seat includes a seat base and a selectively vertically adjustable seatback coupled to the seat base. The selectively vertically adjustable seatback including a first frame component coupled to the seat base and a second frame component connected to the first frame component, the second frame component being shiftable relative to the seat base.

In addition to one or more of the features described herein the first frame component includes a first frame member and a second frame member and the second frame component includes a third frame member and a fourth frame member that are shiftably connected to corresponding ones of the first frame member and the second frame member.

In addition to one or more of the features described herein the third frame member includes a first end disposed at the first frame member and a second end, and the fourth frame member includes a first end portion disposed at the second frame member and a second end portion, the first end including a first plurality of adjustment elements and the first end portion including a second plurality of adjustment elements.

In addition to one or more of the features described herein an adjustment mechanism is arranged at the first frame member. The adjustment mechanism is operable to selectively shift the third frame member and the fourth frame member relative to the first frame member and the second frame member.

In addition to one or more of the features described herein the adjustment mechanism includes a first adjustor arranged in the first frame member and a second adjustor arranged in the second frame member.

In addition to one or more of the features described herein the first adjustor selectively engages the first plurality of adjustment elements and the second adjustor selectively engage the second plurality of adjustment elements to shift the third frame member and the fourth frame member relative to corresponding ones of the first frame member and the second frame member.

In addition to one or more of the features described herein the first plurality of adjustment elements comprise a first plurality of openings formed in the third frame member and the second plurality of adjustment elements comprise a second plurality of openings formed in the fourth frame member.

In addition to one or more of the features described herein the first adjustor comprises a first gear and the second adjustor comprises a second gear, the first gear including a first diameter supporting a first plurality of gear teeth and the second gear includes a second diameter supporting a second plurality of gear teeth.

In addition to one or more of the features described herein the first adjustor comprises a first partial gear and the second adjustor comprises a second partial gear.

In addition to one or more of the features described herein a shaft includes a first end section coupled to the first adjustor, a second end section coupled to the second adjustor, and a knob coupled to one of the first end section and the second end section. The knob is manipulatable to shift the third frame member and the fourth frame member relative to the first frame member and the second frame member respectively.

A vehicle, in accordance with a non-limiting example, includes a body defining, at least in part, a passenger compartment and a seat arranged in the passenger compartment. The seat includes a seat base and a selectively vertically adjustable seatback coupled to the seat base. The selectively vertically adjustable seatback includes a first frame component coupled to the seat base and a second frame component connected to the first frame component. The second frame component is shiftable relative to the seat base.

In addition to one or more of the features described herein the first frame component includes a first frame member and a second frame member and the second frame component includes a third frame member and a fourth frame member that are shiftably connected to corresponding ones of the first frame member and the second frame member.

In addition to one or more of the features described herein the third frame member includes a first end disposed at the first frame member and a second end, and the fourth frame member includes a first end portion disposed at the second frame member and a second end portion, the first end including a first plurality of adjustment elements and the first end portion including a second plurality of adjustment elements.

In addition to one or more of the features described herein an adjustment mechanism is arranged at the first frame member. The adjustment mechanism is operable to selectively shift the third frame member and the fourth frame member relative to the first frame member and the second frame member.

In addition to one or more of the features described herein the adjustment mechanism includes a first adjustor arranged in the first frame member and a second adjustor arranged in the second frame member.

In addition to one or more of the features described herein the first adjustor selectively engages the first plurality of adjustment elements and the second adjustor selectively engages the second plurality of adjustment elements to shift the third frame member and the fourth frame member relative to corresponding ones of the first frame member and the second frame member.

In addition to one or more of the features described herein the first plurality of adjustment elements comprise a first plurality of openings formed in the third frame member and the second plurality of adjustment elements comprise a second plurality of openings formed in the fourth frame member.

In addition to one or more of the features described herein the first adjustor comprises a first gear and the second adjustor comprises a second gear, the first gear including a first diameter supporting a first plurality of gear teeth and the second gear includes a second diameter supporting a second plurality of gear teeth.

In addition to one or more of the features described herein the first adjustor comprises a first partial gear and the second adjustor comprises a second partial gear.

In addition to one or more of the features described herein a shaft includes a first end section coupled to the first adjustor, a second end section coupled to the second adjustor, and a knob coupled to one of the first end section and the second end section. The knob is manipulatable to shift the third frame member and the fourth frame member relative to the first frame member and the second frame member respectively.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
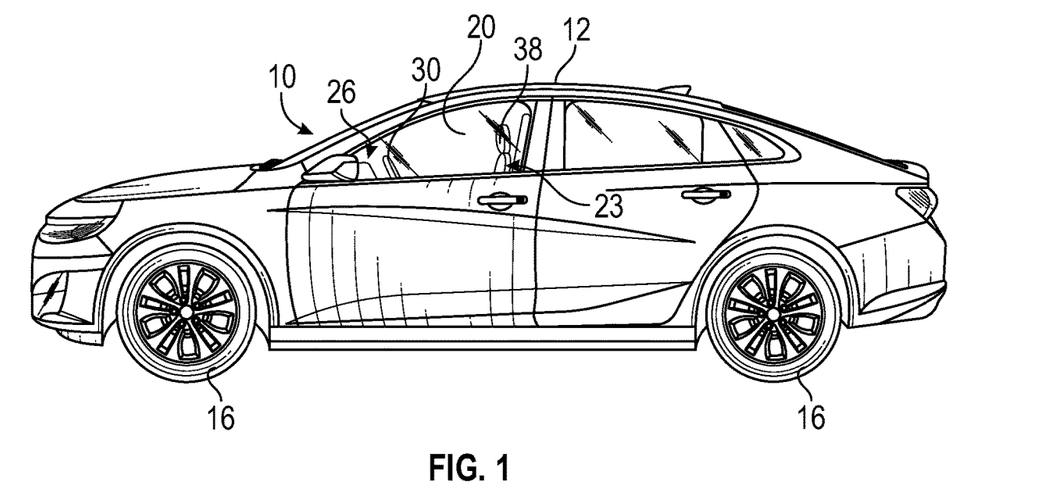
FIG. 1 is a left side view of a vehicle including a vertically height adjustable seatback, in accordance with a non-limiting example.

A vehicle, in accordance with a non-limiting example, is indicated generally at 10 in FIG. 1. Vehicle 10 includes a body 12 supported on a plurality of wheels 16. At least one of the plurality of wheels 16 is steerable. Body 12 defines, in part, a passenger compartment 20 having seats, one of which is indicated at 23. Seat 23 is positioned behind a dashboard 26. A steering control system 30 is arranged between seat 23 and dashboard 26.

Figure 2:
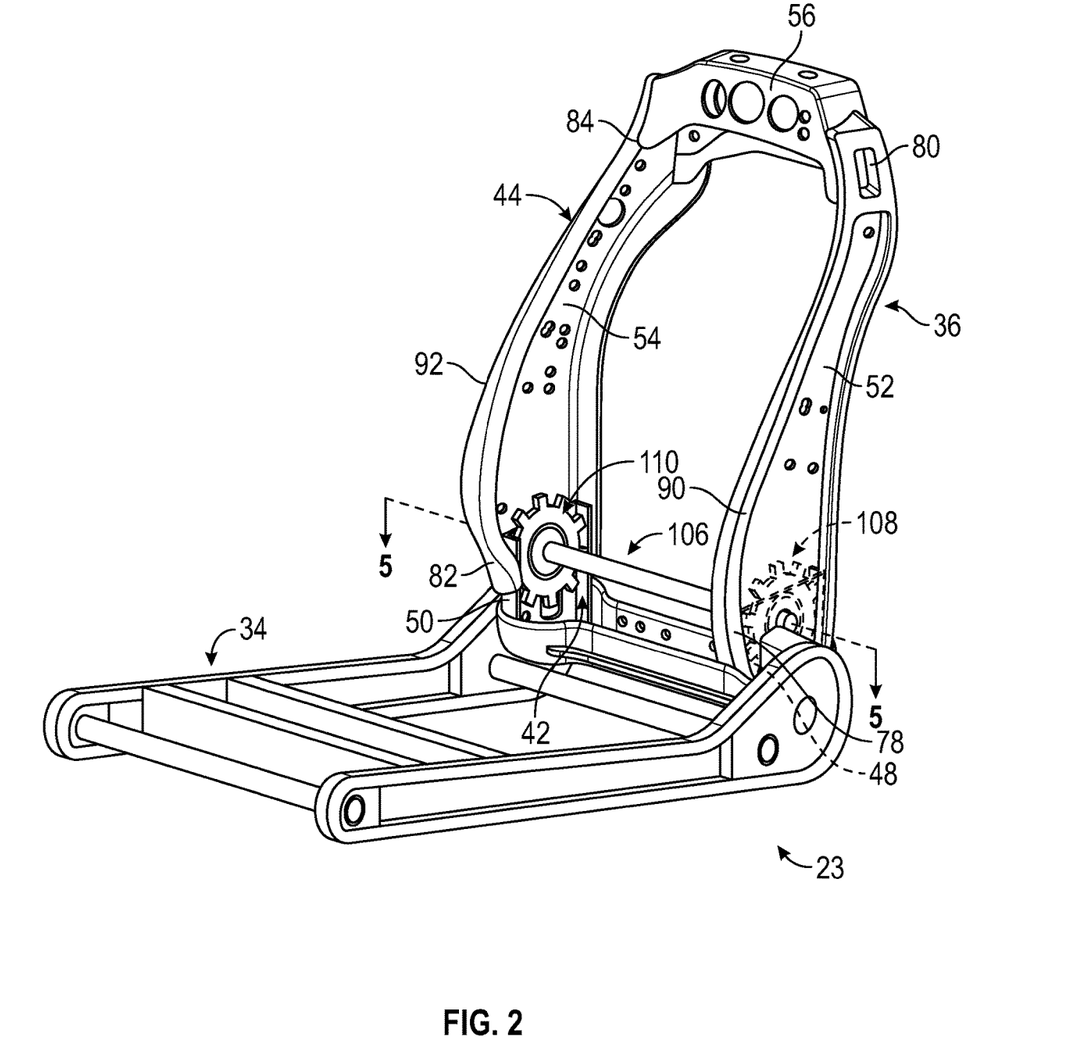
FIG. 2 is a left side perspective view of the a vertically height adjustable seatback without upholstery, in accordance with a non-limiting example.
Figure 3A:
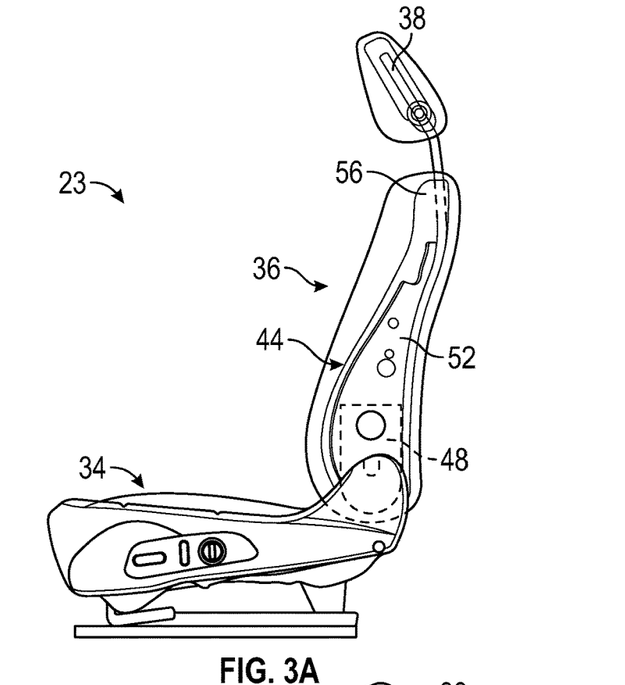
FIG. 3A is a left side view of a vehicle seat having a vertically height adjustable seatback in a first position, in accordance with a non-limiting example.
Figure 3B:
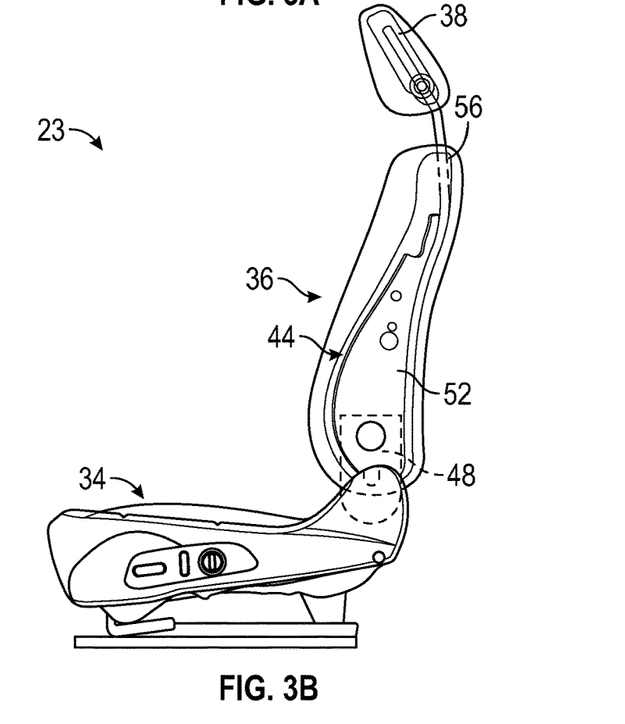
FIG. 3B is a left side view of a vehicle seat having a vertically height adjustable seatback in a second position, in accordance with a non-limiting example.

Referring to FIG. 2 and with continued reference to FIG. 1, seat 23 includes a seat base 34 and a seatback 36 supporting a headrest 38 (FIG. 1). Seatback 36 is selectively vertically height adjustable. The term "vertically height adjustable" describes a property of seat 23 that, when in an upright position, a portion of seatback 36 may transition upwardly and/or downwardly relative to seat base 34 and/or a passenger compartment floor (not separately labeled) in vehicle 10. That is, seatback 36 may transition between a first or lowered position (FIG. 3A) and a second or raised position (FIG. 3B) when adjusted by a user.

In a non-limiting example, seatback 36 includes a first frame component 42 and a second frame component 44. First frame component 42 is fixedly connected relative to seat base 34. Second frame component 44 is connected with and shiftable relative to, first frame component 42. Further, first frame component 42 and second frame component 44 may be covered by upholstery, trim covering, or the like (not shown in FIG. 2).

Figure 4:
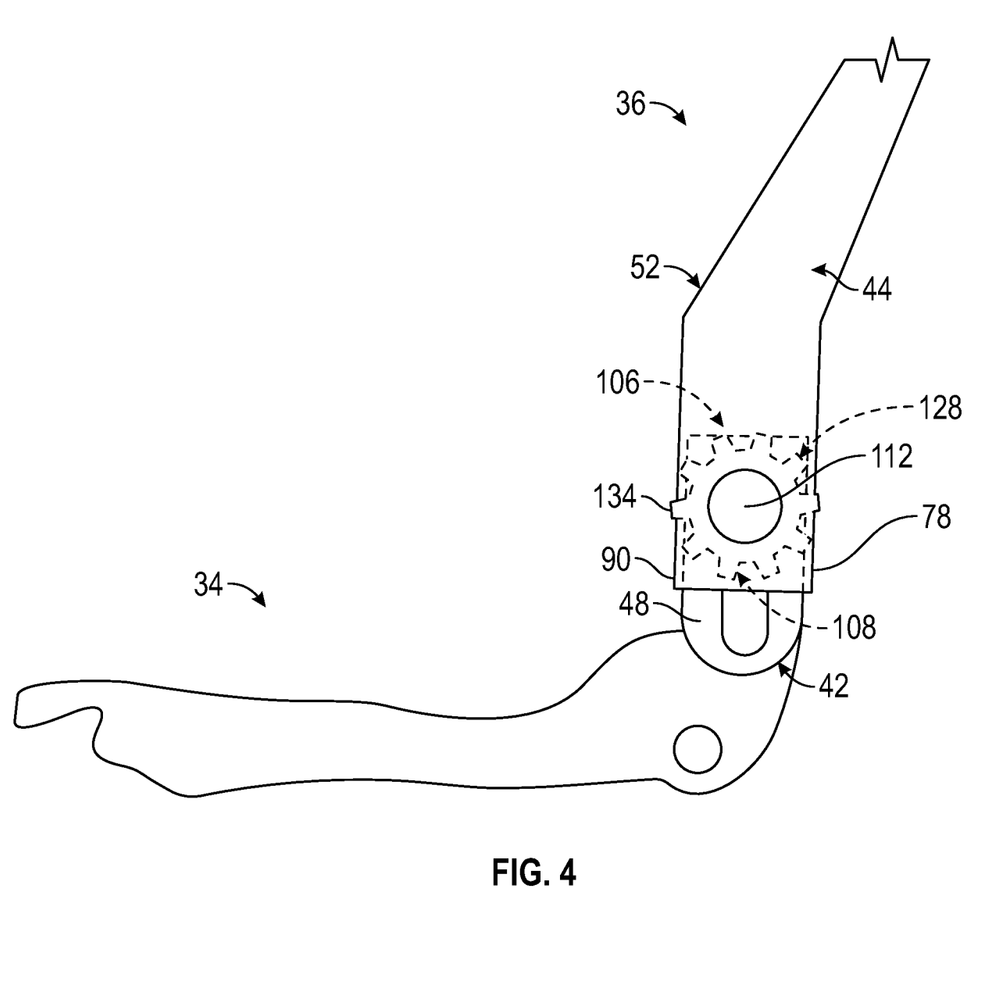
FIG. 4 is a left side view of an adjustment mechanism of the vertically height adjustable seatback of FIG. 2, in accordance with a non-limiting example.
Figure 5:
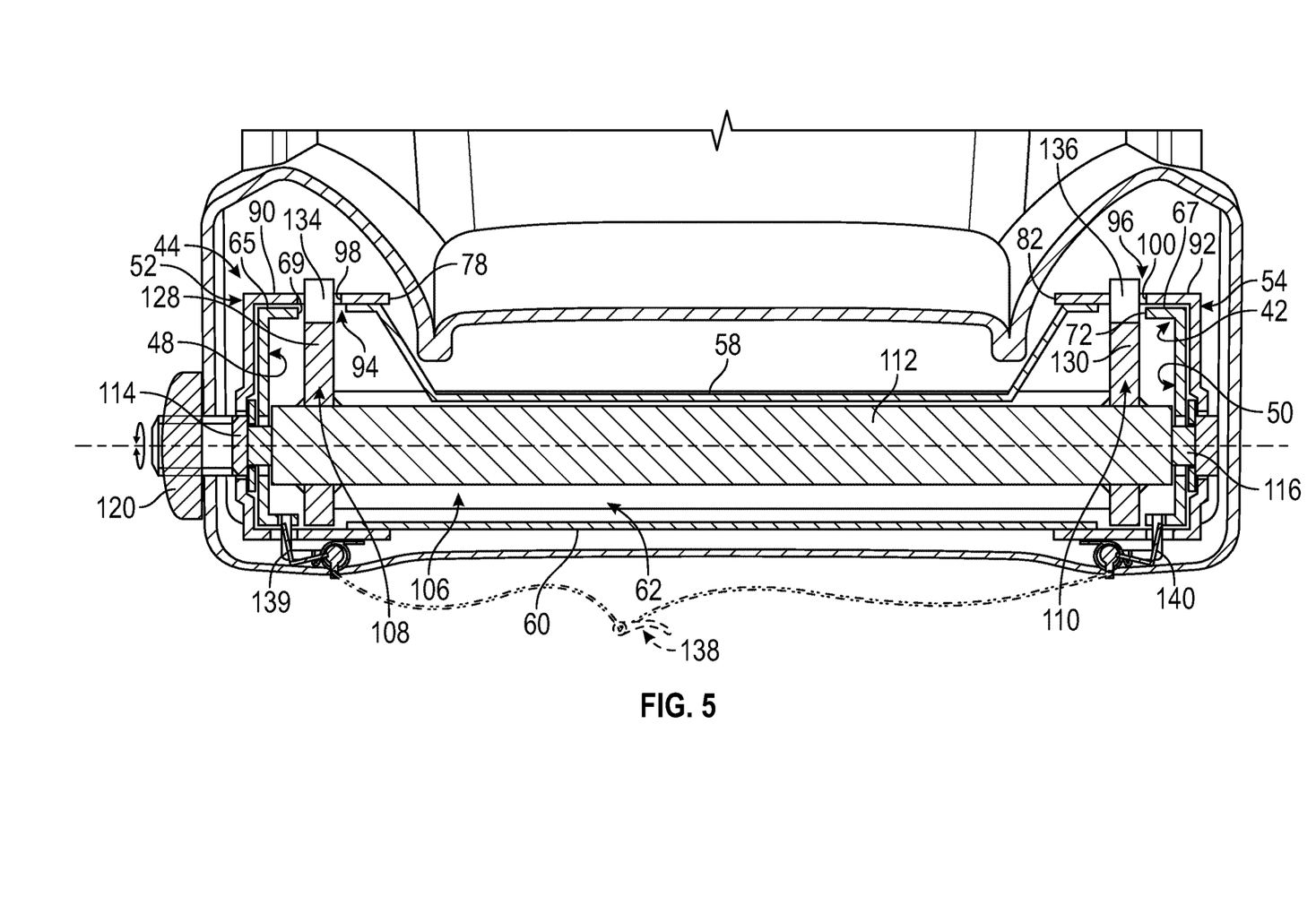
FIG. 5 is cross-sectional top view of the vertically height adjustable seatback of FIG. 2 taken through the line 5-5 of FIG. 2, in accordance with a non-limiting example.

Referring to FIGS. 4 and 5 and with continued reference to FIG. 2, first frame component 42 includes a first frame member 48 that is pivotally connected to a first side (not separately labeled) of seat base 32 and a second frame member 50 that is pivotally connected to a second side (also not separately labeled) of seat base 32. With this construction, seatback 36 may pivot forwardly and rearwardly relative to seat base 34. Second frame component 44 includes a third frame member 52 that is shiftably connected to first frame member 48 and a fourth frame member 54 that is shiftably connected to second frame member 50. Third frame member 52 is connected to fourth frame member 54 through a top member 56 that supports headrest 38.

In a non-limiting example, seatback 36 may include a first or front cross-frame 58 extending between and connected with third frame member 52 and fourth frame member 54. A second or rear cross-frame 60 extends between and connected with third frame member 52 and fourth frame member 54. Second cross-frame 60 is spaced from first cross-frame 58. A housing portion 62 is defined between first cross-frame 58 and second cross frame 60 and between third frame member 52 and fourth frame member 54. Continuing to reference FIG. 5, first frame member 48 includes a first outwardly facing surface 65 and second frame member 50 includes a second outwardly facing surface 67.

A first opening 69 is defined between a first end (not separately labeled) of first frame member 48 and first cross frame 58. A second opening 72 is defined between a second end (also not separately labeled) of first frame member 48 and second frame member 50 and first cross frame 58. Third frame member 52 includes a first end 78 that extends about first frame member 48 (FIG. 6) and a second end 80 (FIG. 2). Fourth frame member 54 includes a first end portion 82 and a second end portion 84. First end 78 includes a first outwardly facing surface 90 and first end portion 82 includes a second outwardly facing surface 92.

A first plurality of adjustment elements 94 is provided on first outwardly facing surface 90 of third frame member 52. A second plurality of adjustment elements 96 is provided on second outwardly facing surface 92 of fourth frame member 54. First plurality of adjustment elements 94 may take the form of a first plurality of openings 98 and second plurality of adjustment elements 96 may take the form of a second plurality of openings 100.

Figure 6:
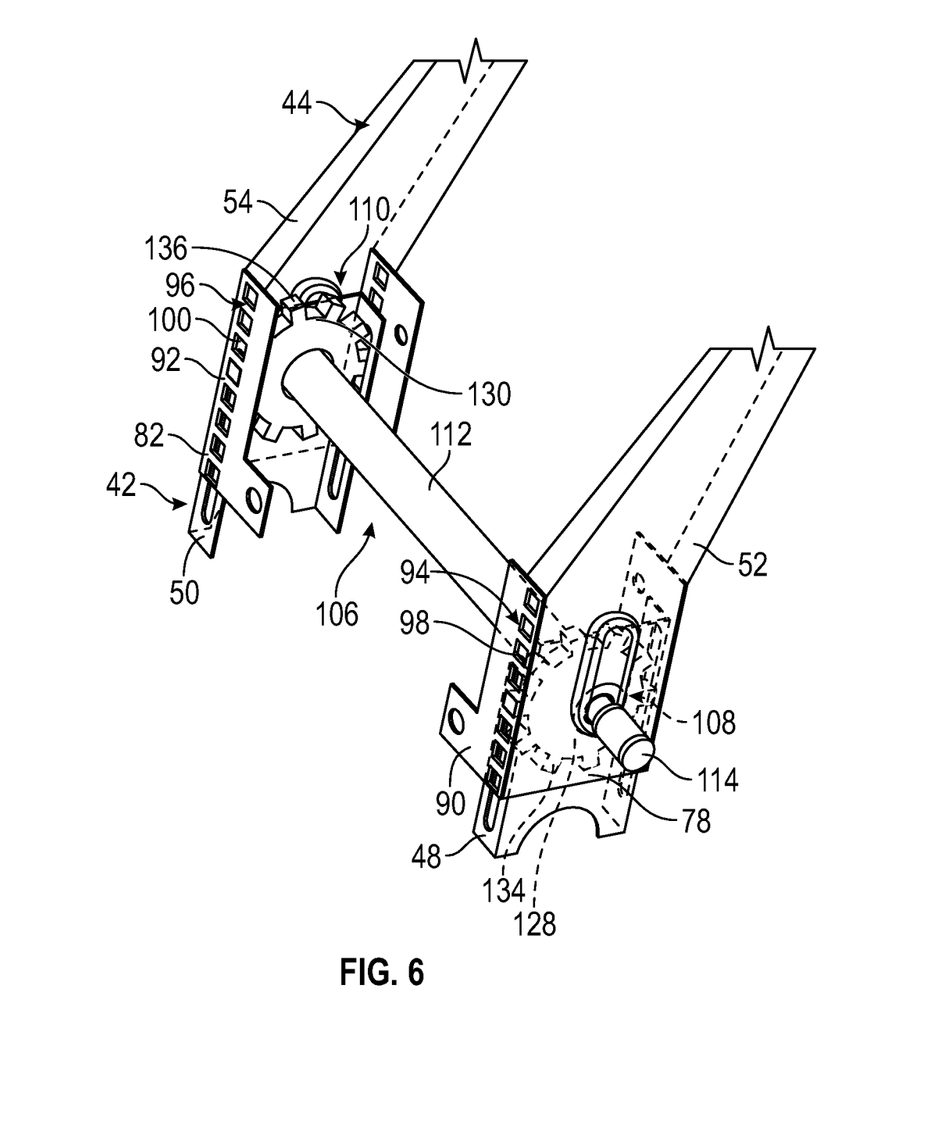
FIG. 6 is a glass view of a portion of the adjustment mechanism of FIG. 3, in accordance with a non-limiting example.

With continued reference to FIGS. 5 and 6, an adjustment mechanism 106 is coupled to seatback 36 in housing portion 62. Adjustment mechanism 106 includes a first adjustor 108 arranged in first frame member 48 and a second adjustor 110 arranged in second frame member 50. A shaft 112 extends generally parallel to first cross frame 58 and second cross frame 60 and connects first adjustor 108 and second adjustor 110. Shaft 112 includes a first end section 114 that passes through first frame member 48 and third frame member 52 (FIG. 6) and a second end section 116 that passes through second frame member 50 and fourth frame member 54. A knob 120 is mounted to first end section 114. Knob 120 may be used to rotate first adjustor 108 and second adjustor 110 to shift third frame member 52 and fourth frame member 54 between the first position (FIG. 3A) and the second position (FIG. 3B) as will be detailed more fully herein.

In a non-limiting example, first adjustor 108 takes the form of a first gear 128 fixedly mounted to first end section 114 of shaft 112. Second adjustor 110 takes the form of a second gear 130 fixedly mounted to second end section 116 of shaft 112. First gear 128 includes a first diameter and a first plurality of gear teeth 134 that extend entirely around the first diameter. Second gear 130 includes a second diameter and a second plurality of gear teeth 136 that extend entirely about the second diameter. First plurality of gear teeth 134 selectively extend into one or more of the first plurality of adjustment elements 94 and second plurality of gear teeth 136 extend into one or more of the second plurality of adjustment elements 96. While first adjustor 108 and second adjustor 110 are shown in the form of manually operated gears or knobs, it should be understood that adjustment mechanism 106 may include an electric motor that is selectively operated to shift seatback 36 relative to seat base 34.

In a non-limiting example, a user may rotate knob 120 causing first gear 128 and second gear and 130 to rotate with shaft 112. The first plurality of gear teeth 134 selectively engage with and act upon the first plurality of adjustment elements 94 and the second plurality of gear teeth 136 engage with an act upon the second plurality of adjustment elements 96. Depending on the direction of rotation of knob 120 results in third frame member 52 and fourth frame member 54 translating relative to first frame member 48 and second frame member 50 respectively. This translation or vertical movement allows seatback height to be adjusted to accommodate a user's unique body parameters. Seat 23 may include a locking mechanism 138 (FIG. 5) that locks movement of adjustment mechanism 106 when not in use. Locking mechanism 138 may take on a variety of forms including latches 139 and 140 that selectively secure third frame member 52 and fourth frame member 54 to first frame member 48 and second frame member 50 respectively.

Figure 7:
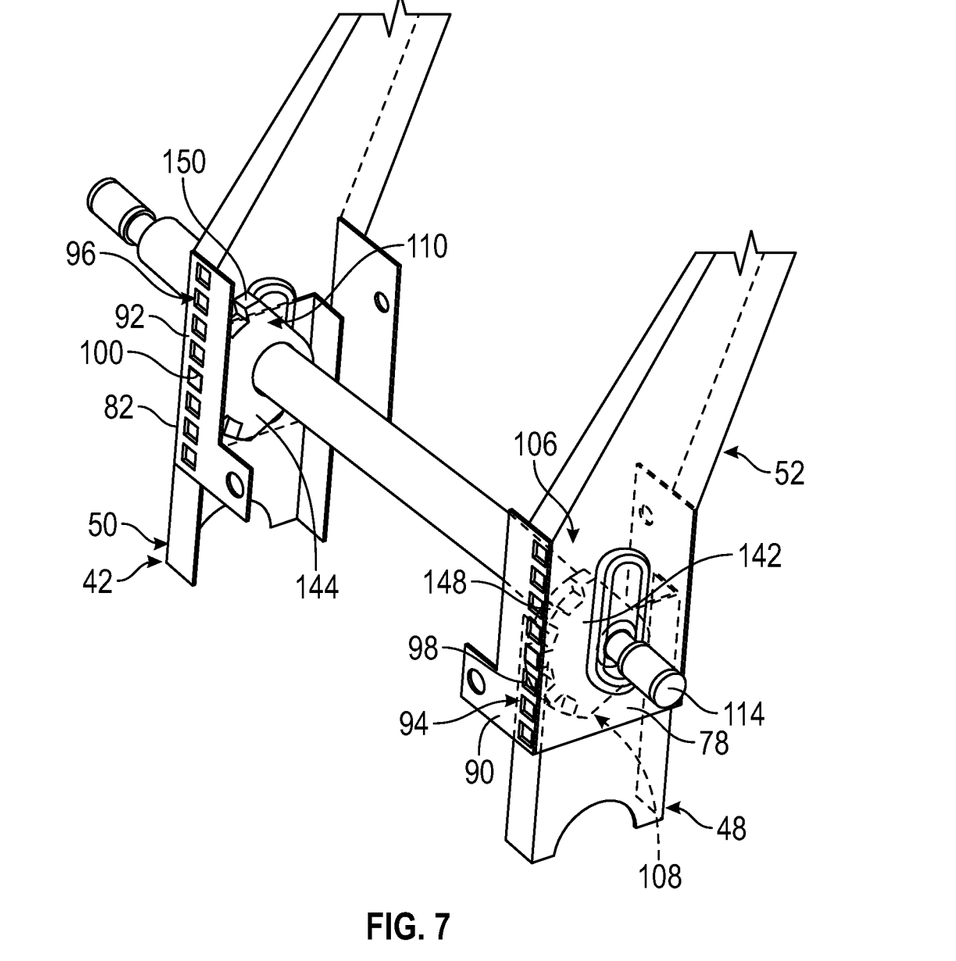
FIG. 7 is a glass view of a portion of the adjustment mechanism of FIG. 3, in accordance with another non-limiting example.

In another non-limiting example shown in FIG. 7, first adjustor 108 may take the form of a first partial gear 142 and second adjustor 110 may take the form of a second partial gear 144. First partial gear 142 includes a first plurality of gear teeth 148 that extend about a portion of a gear surface (not separately labeled) and second partial gear 144 includes a second plurality of gear teeth 150 that extend about a portion of a gear surface (also not separately labeled). The use of partial gears limits the amount of rotation needed to transition third frame member 52 and fourth frame member 54 relative to first frame member 48 and second frame member 50 respectively.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat comprising:
    a seat base comprising a pair of side walls;
    a seatback coupled to the seat base,
    a first frame member and a second frame member that are spaced apart from each other and coupled to the seat base between the side walls of the seat base;
    an adjustment mechanism comprising a shaft extending along a lateral axis between the first frame member and the second frame member and rotatably mounted on the first frame member and the second frame member so as to be rotatable about the lateral axis but fixed linearly with respect to the first frame member and the second frame member, a first adjustor mounted on the shaft and rotatable therewith, the first adjustor comprising a first plurality of gear teeth, and a second adjustor mounted on the shaft and rotatable therewith, the second adjustor comprising a second plurality of gear teeth;
    a third frame member coupled to the first frame, member via the first adjustor and comprising a first outwardly facing surface that is parallel to the lateral axis and that comprises a first plurality of openings, the first plurality of gear teeth of the first adjustor engageable with the first plurality of openings such that, when the first adjustor is rotated about the lateral axis, the third frame member is moved linearly with respect to the first frame member; and
    a fourth frame member coupled to the second frame member via the second adjustor and comprising a second outwardly facing surface that is parallel to the lateral axis and that comprises a second plurality of openings, the second plurality of gear teeth of the second adjustor engageable with the second plurality of openings such that, when the second adjustor is rotated about the lateral axis, the fourth frame member is moved linearly with respect to the second frame member, wherein the seatback comprises a forward surface structured as a back support portion and a rear surface opposite the forward surface, and a pair of side surfaces extending between the forward surface and the rear surface, wherein the third and fourth frame members are disposed entirely within a space defined by the forward surface, the rearward surface, and the side surfaces, and wherein the seatback is fixed to the third and fourth frame members so as to be movable linearly relative to the seat base.

2. The vehicle seat according to claim 1, wherein the third frame member includes a first end disposed at the first frame member and a second end, and the fourth frame member includes a first end portion disposed at the second frame member and a second end portion, the first end including the first outwardly facing surface and the first plurality of openings and the first end portion including the second outwardly facing surface and the second plurality of openings.

3. The vehicle seat according to claim 1, wherein the first adjustor comprises a first gear and the second adjustor comprises a second gear, the first gear including a first diameter supporting the first plurality of gear teeth and the second gear includes a second diameter supporting the second plurality of gear teeth.

4. The vehicle seat according to claim 1, wherein the first adjustor comprises a first partial gear and the second adjustor comprises a second partial gear.

5. The vehicle seat according to claim 1, wherein the shaft includes a first end section coupled to the first adjustor, a second end section coupled to the second adjustor, and a knob coupled to one of the first end section and the second end section, the knob being manipulatable to shift the third frame member and the fourth frame member relative to the first frame member and the second frame member respectively.

6. The vehicle seat according to claim 1, wherein the first outwardly facing surface is positioned on a front side of the first adjustor, and the second outwardly facing surface is positioned on a front side of the second adjustor.

7. The vehicle seat according to claim 6, wherein the third frame member further comprises a third outwardly facing surface that is parallel to the lateral axis and that comprises a third plurality of openings, and the fourth frame member further comprises a fourth outwardly facing surface that is parallel to the lateral axis and that comprises a fourth plurality of openings.

8. The vehicle seat according to claim 7, wherein the third outwardly facing surface is positioned on a rear side of the first adjustor, and the fourth outwardly facing surface is positioned on a rear side of the second adjustor.

9. The vehicle seat according to claim 8, wherein the first adjustor is configured to simultaneously engage with the first plurality of openings and the third plurality of openings, and the second adjustor is configured to simultaneously engage with the second plurality of openings and the fourth plurality of openings.

10. The vehicle seat according to claim 1, wherein the first frame member defines a first elongated slit, the second frame member defines a second elongated slit, and the shaft is disposed through the first elongated slit and the second elongated slit so as to be linearly movable within the first elongated slit and the second elongated slit.

11. The vehicle according to claim 6, wherein the third frame member further comprises a third outwardly facing surface that is parallel to the lateral axis and that comprises a third plurality of openings, and the fourth frame member further comprises a fourth outwardly facing surface that is parallel to the lateral axis and that comprises a fourth plurality of openings.

12. The vehicle according to claim 7, wherein the third outwardly facing surface is positioned on a rear side of the first adjustor, and the fourth outwardly facing surface is positioned on a rear side of the second adjustor.

13. The vehicle according to claim 8, wherein the first adjustor is configured to simultaneously engage with the first plurality of openings and the third plurality of openings, and the second adjustor is configured to simultaneously engage with the second plurality of openings and the fourth plurality of openings.

14. A vehicle comprising:
a body defining, at least in part, a passenger compartment; and
a seat arranged in the passenger compartment, the seat comprising:
a seat base, the seat base comprising a pair of side walls; and
a seatback coupled to the seat base,
a first frame member and a second frame member that are spaced apart from each other and coupled to the seat base between the side walls of the seat base;
an adjustment mechanism comprising a shaft extending along a lateral axis between the first frame member and the second frame member and rotatably mounted on the first frame member and the second frame member so as to be rotatable about the lateral axis but fixed linearly with respect to the first frame member and the second frame member, a first adjustor mounted on the shaft and rotatable therewith, the first adjustor comprising a first plurality of gear teeth, and a second adjustor mounted on the shaft and rotatable therewith, the second adjustor comprising a second plurality of gear teeth;
a third frame member coupled to the first frame, member via the first adjustor and comprising a first outwardly facing surface that is parallel to the lateral axis and that comprises a first plurality of openings, the first plurality of gear teeth of the first adjustor engageable with the first plurality of openings such that, when the first adjustor is rotated about the lateral axis, the third frame member is moved linearly with respect to the first frame member; and
a fourth frame member coupled to the second frame member via the second adjustor and comprising a second outwardly facing surface that is parallel to the lateral axis and that comprises a second plurality of openings, the second plurality of gear teeth of the second adjustor engageable with the second plurality of openings such that, when the second adjustor is rotated about the lateral axis, the fourth frame member is moved linearly with respect to the second frame member, wherein the seatback is fixed to the third and fourth frame members so as to be linearly movable relative to the seat base, wherein the seatback comprises a forward surface structured as a back support portion and a rear surface opposite the forward surface, and a pair of side surfaces extending between the forward surface and the rear surface, and wherein the third and fourth frame members are disposed entirely within a space defined by the forward surface, the rearward surface, and the side surfaces.

15. The vehicle according to claim 14, wherein the third frame member includes a first end disposed at the first frame member and a second end, and the fourth frame member includes a first end portion disposed at the second frame member and a second end portion, the first end including the first outwardly facing surface and the first plurality of openings and the first end portion including the second outwardly facing surface and the second plurality of openings.

16. The vehicle according to claim 14, wherein the first adjustor comprises a first gear and the second adjustor comprises a second gear, the first gear including a first diameter supporting the first plurality of gear teeth and the second gear includes a second diameter supporting the second plurality of gear teeth.

17. The vehicle according to claim 14, wherein the first adjustor comprises a first partial gear and the second adjustor comprises a second partial gear.

18. The vehicle according to claim 14, wherein the shaft includes a first end section coupled to the first adjustor, a second end section coupled to the second adjustor, and a knob coupled to one of the first end section and the second end section, the knob being manipulatable to shift the third frame member and the fourth frame member relative to the first frame member and the second frame member respectively.

19. The vehicle according to claim 14, wherein the first outwardly facing surface is positioned on a front side of the first adjustor, and the second outwardly facing surface is positioned on a front side of the second adjustor.

20. The vehicle according to claim 14, wherein the first frame member defines a first elongated slit, the second frame member defines a second elongated slit, and the shaft is disposed through the first elongated slit and the second elongated slit so as to be linearly movable within the first elongated slit and the second elongated slit.

\* \* \* \* \*